United States Patent [19]
Manabe et al.

[11] Patent Number: 5,599,609
[45] Date of Patent: Feb. 4, 1997

[54] NONLINEAR OPTICAL MATERIAL AND METHOD OF PRODUCING THE SAME

[75] Inventors: Yoshio Manabe; Masaru Yoshida, both of Katano; Ichiro Tanahashi; Tsuneo Mitsuyu, both of Hirakata, all of Japan

[73] Assignee: Matsushita Electric Industrial Co., Ltd., Osaka, Japan

[21] Appl. No.: 249,975

[22] Filed: May 27, 1994

[30] Foreign Application Priority Data

Jun. 1, 1993 [JP] Japan .................................. 5-130301

[51] Int. Cl.[6] ........................... B32B 5/16; G02B 1/10
[52] U.S. Cl. ......................... 428/212; 359/359; 359/361; 359/580; 359/582; 428/325; 428/328; 428/329; 428/331; 428/332; 428/335; 428/336; 428/432; 428/698; 428/699; 428/701; 428/702; 428/704; 428/913
[58] Field of Search .................... 428/323, 328, 428/329, 330, 331, 698, 699, 701, 702, 704, 332, 335, 336, 913, 325, 432, 689, 697, 404, 212; 385/122; 359/354, 361, 580, 582

[56] References Cited

U.S. PATENT DOCUMENTS

| | | | |
|---|---|---|---|
| 4,806,579 | 2/1989 | Calvert et al. | 524/99 |
| 5,024,974 | 6/1991 | Nakamura et al. | 501/57 |
| 5,041,569 | 3/1995 | Kineri et al. | 428/323 |

FOREIGN PATENT DOCUMENTS

| | | |
|---|---|---|
| 5-142604A | 6/1993 | Japan . |
| 5-158094A | 6/1993 | Japan . |

*Primary Examiner*—Hoa T. Le
*Attorney, Agent, or Firm*—Fish & Richardson PC

[57] ABSTRACT

A nonlinear optical material includes nitride layers and non-nitride layers which are alternately deposited, wherein the non-nitride layers include at least one non-nitride selected from the group consisting of oxides, carbides and semiconductors and at least one type of semiconductor fine particles having a band gap smaller than a band gap of the nitride and the non-nitride, which particles are dispersed in the non-nitride layer.

8 Claims, 8 Drawing Sheets

NONLINEAR OPTICAL MATERIAL AND METHOD OF PRODUCING THE SAME

FIELD OF THE INVENTION

This invention relates to a nonlinear optical material for optical devices using a semiconductor-fine-particle dispersed thin film and methods of producing the same.

BACKGROUND OF THE INVENTION

Nonlinear optical materials have been disclosed, for example, in Journal of Optical Society of America, Vol. 73 (1983), p. 647. These materials comprise a cut-off filter glass formed of borosilicate glass with a semiconductor $CdS_xSe_{1-x}$ wherein X is 0 to 1 dispersed therein. The material is produced by melting a mixture of $CdS_xSe_{1-x}$ and borosilicate glass, quenching the mixture to disperse ions of Cd, S and Se in the borosilicate glass, reheating it to 600° to 700° C., and precipitating fine particles of $CdS_xSe_{1-x}$ throughout the glass. The mean particle diameter of the particles is dependent on temperature and time of reheating; The mean particle diameter is proportional to the reheating time to the one-third power.

Another thin film glass dispersed with CdS fine particles is disclosed in Journal of Applied Physics, Vol. 63 (1988), p. 957. This glass is produced by the high frequency magnetron sputtering method using CdS and a Ba-containing borosilicate glass by dispersing 2 to 4 at .% of CdS throughout the borosilicate glass and reheating the glass to 400° to 500° C. for about 24 h to precipitate fine CdS particles. The mean particle diameter of the CdS particles is also proportional to the reheating time to the one-third power.

The smaller and more homogeneous the particle size distribution of a semiconductor fine particle dispersed in a glass matrix, the more optical effects are provided. An appropriate content or composition of the semiconductor is desired.

Conventional methods of producing nonlinear optical materials from glass having semiconductor fine particles dispersed therein had the following problems; Melting a mixture of $CdS_xSe_{1-x}$ and borosilicate glass at high temperatures and reheating it enlarges the particle size distribution of the dispersed semiconductor fine particles too much. When the content of the semiconductor in the material is above 4 at .%, its particle diameter becomes too large to be a fine particle. Such an inappropriately large particle size affects nonlinear optical properties. In other words, large particles make the glass white or clouded or reduce the intensity of the emission spectrum of the semiconductor in the vicinity of optical adsorption.

With the high frequency magnetron sputtering method, a long heat treatment time enlarges the particle size distribution of the semiconductor fine particles too much.

With the sputtering method, the composition change of the semiconductor in the thin film occurs due to the evaporation of the semiconductor; Of the compositions of the semiconductor material, some elements easily evaporate or sublime so that the composition of the semiconductor deviates from the original composition. The particle diameter of the semiconductor similarly increases with the content of the semiconductor.

SUMMARY OF THE INVENTION

An object of the invention is to provide a nonlinear optical material having a high content of semiconductor particles and a small particle size distribution simultaneously.

The nonlinear optical material of the invention comprises nitride layers and non-nitride layers with at least one kind of semiconductor fine particle dispersed which are alternately deposited, wherein the non-nitride layer comprises at least one non-nitride selected from the group consisting of oxides, carbides and semiconductors, and the semiconductor fine particle in the non-nitride layer has an energy band gap smaller than the energy band gap of either the nitride or the non-nitride materials.

It is preferable in the invention that the nitride layer is made from at least one material selected from the group consisting of aluminum nitride, silicon nitride, boron nitride, indium nitride, gallium nitride and titanium nitride. These nitrides are effective in controlling the particle diameter of the semiconductor particles, though most known nitride materials are available in the invention.

It is also preferable in the invention that the non-nitride is at least one material selected from the group consisting of silicon oxide, aluminum oxide, titanium oxide, zinc oxide, indium oxide, silicon carbide, boron carbide, titanium carbide, silicon, aluminum arsenate, gallium arsenate, indium arsenate and borosilicate glass.

It is also preferable in the invention that the semiconductor fine particles are from at least one semiconductor selected from the group consisting of CuCl, GaAs, InP, GaAlAs, ZnSe, ZnS, ZnTe, CdSe, CdS, CdTe, ZnCdSe, ZnSSe, Si, Ge and SiGe.

It is also preferable in the invention that the content of the semiconductor fine particles in the non-nitride layer is 0.01 to 50 at .% of the non-nitride layer.

It is also preferable in the invention that the thickness of the material is 10 to 2000 nm.

It is also preferable in the invention that the thickness of the nitride layer is 0.25 to 50 nm.

It is also preferable in the invention that the thickness of the non-nitride layer is 0.5 to 10 nm. Non-nitride layers having such a thickness improve the crystallinity of the semiconductor fine particles.

A first method of the invention comprises repeatedly and alternately forming a nitride layer by sputtering a nitride target and forming a non-nitride layer dispersed with semiconductor fine particles therein on the nitride layer by sputtering a semiconductor target and a non-nitride target.

A second method of the invention comprises repeatedly (a) forming a nitride layer on a substrate by reacting a nitride material gas on the substrate, (b) forming a non-nitride layer on the nitride layer by reacting a non-nitride material gas, and (c) forming at least one type of semiconductor fine particle in the non-nitride layer by reacting a semiconductor material gas with the non-nitride layer.

It is preferable in the second method that the semiconductor material gas is at least one gas selected from the group consisting of $PH_3$, $AsH_3$, $H_2S$, $H_2Se$, $SiH_4$, $GeH_4$, $SiCl_4$, $GeCl_4$, $AR_3$ wherein A represents a III or V group element selected from the group consisting of B, Al, Ga, In, N, P, As and Sb, and R represents a methyl or ethyl group, and $DR_2$ wherein D represents a II or VI group element selected from the group consisting of Zn, Cd, Hg, Mg, S, Se and Te, and R represents a methyl or ethyl group.

A third method of the invention comprises the steps of alternately depositing a nitride layer and a non-nitride layer, implanting at least one semiconductor having an energy band gap smaller than the energy band gaps of either the nitride layer material or the non-nitride layer material into the deposited layers, and heating the layers to form semiconductor fine particles in the non-nitride layer.

It is preferable in the third method that the implanting is performed by ion implantation or focused ion beam lithography.

It is also preferable in the third method that the heating is carried out at a temperature ranging from 400° C. to 1000° C.

It is also preferable in all the methods that an electron cyclotron resonance (hereinafter, abbreviated as ECR) plasma is used to form the nitride layer, the non-nitride layer or the semiconductor fine particles.

DETAILED DESCRIPTION OF THE INVENTION

Figure 1:
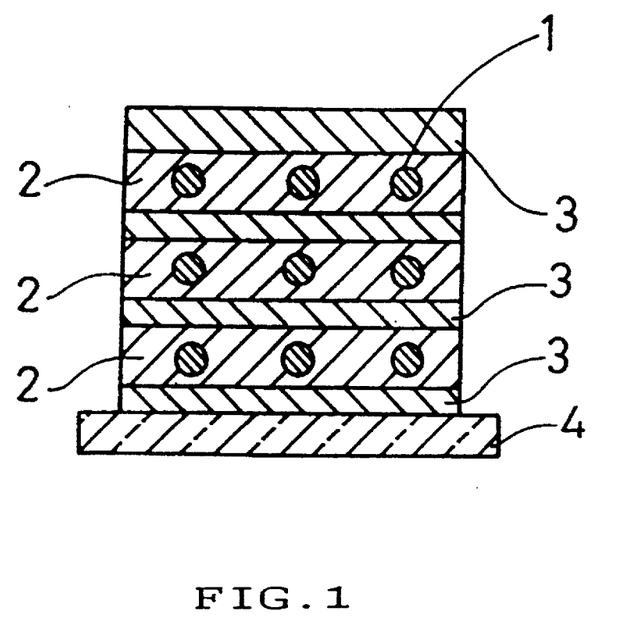
FIG. 1 is a sectional view of a nonlinear optical material of an embodiment of the invention.

FIG. 1 shows a section of a nonlinear optical material of a preferred embodiment of the invention. The material on substrate 4 comprises nitride layers 3 and non-nitride layers 2, which are alternately deposited. Semiconductor fine particles 1 are dispersed in each non-nitride layer 2.

The fine particles 1 have energy band gaps smaller than the energy band gaps of any of the materials of layers 2 and 3. Semiconductors can readily diffuse and precipitate throughout non-nitride layers 2, because the semiconductor has a large diffusion coefficient in a non-nitride such as oxide, carbide or semiconductor. The semiconductor then exists as fine particles in the layers 2 Here, the mean particle diameter of the semiconductor is proportional to the reheating time to the one-third power. On the other hand, semiconductors diffuse very little vertically into nitride layers 3, because of a small diffusion coefficient in nitrides.

As a result, the particle diameter of semiconductor fine particles 1 is limited to the thickness of the non-nitride layer 2. The content of semiconductor fine particles is increased without enlarging their particle diameters. Therefore, the invention provides a nonlinear optical material containing semiconductor fine particles with a narrow particle size distribution.

To control the particle diameter of the semiconductor for the best possible nonlinear optical properties, the nitride layer preferably comprises aluminum nitride, silicon nitride, boron nitride, indium nitride, gallium nitride, titanium nitride or the like.

For this purpose, the non-nitride preferably comprises silicon oxide, aluminum oxide, titanium oxide, zinc oxide, indium oxide, silicon carbide, boron carbide, titanium carbide, silicon, aluminum arsenate, gallium arsenate, indium arsenate, borosilicate glass or the like.

In addition, the semiconductor fine particles preferably comprise CuCl, GaAs, InP, GaAlAs, ZnSe, ZnS, ZnTe, CdSe, CdS, CdTe, ZnCdSe, ZnSSe, Si, Ge, SiGe or the like.

Although the suitable content of the semiconductor fine particles in the non-nitride layer is dependent on the intended use or requirement of the material, it is preferably in a range of 0.01 to 50 at .%.

The nitride layer preferably has a thickness of 0.25 to 50 nm, and the nitride layer is preferably 0.5 to 5 times as thick as the non-nitride layer.

In the first method of the invention, the targets of nitride, non-nitride and semiconductor material are independently set in the vacuum chamber of a sputtering device. A series of steps of forming nitride layers and non-nitride layers is performed one by one so that the thickness of the non nitride layers is controlled and the particle diameter of the semiconductor becomes uniform. Further, the nitride layers prevent evaporation of the particles, as well as deviation of the composition of the semiconductor. Therefore, the semiconductor fine particles are evenly dispersed in the intended composition.

Sputtering is preferably performed in argon gas as an inert atmosphere under a pressure of $10^{-2}$ to 30 Pa, though the conditions are not particularly limitative. The power applied to the targets is preferably 20 to 500 W, though it depends on the kind of target materials, the content of semiconductor in the non-nitride layer and the like. Sputtering procedures include rf sputtering, dc glow discharge sputtering, ECR sputtering and the like. The ECR plasma method forms thin films at relatively low temperatures.

The second method of the invention using gas materials rapidly produces a nonlinear optical material. In the second method, gases of the nitride, non-nitride and semiconductor materials independently react to precipitate the nitride, the non-nitride and the semiconductor, respectively. This method also avoids evaporation of the particles and the resulting deviation of the composition of the semiconductor. The thickness of non-nitride layers is also controlled, and the particle diameter of the semiconductor becomes uniform. Therefore, the semiconductor fine particles are evenly dispersed in the intended composition. ECR plasma is effective for forming nitride layers by reaction with a nitrogen containing gas.

The second method is accomplished by high frequency plasma CVD, heat CVD, laser CVD, ECR plasma CVD, or the like. For example, a nonlinear optical material comprising SiN layers and alumina layers with ZnSe particles dispersed therein is effectively produced by high frequency plasma CVD.

Conventional various material gases are used in forming layers of semiconductor, oxide or nitride in the CVD methods; For the synthesis of III–V compound semiconductors are used $PH_3$. $AsH_3$, $AR_3$ wherein A represents a III or V group element, and R represents a methyl or ethyl group, or the like.

For the synthesis of II–VI group compound semiconductors are used $H_2S$, $H_2Se$, $DR_2$ wherein D represents a II or VI group element, and R represents a methyl or ethyl group, or the like.

For the synthesis of IV compound semiconductors are used $SiH_4$, $GeH_4$, $SiCl_4$, $GeCl_4$, or the like. For the synthesis of oxide or carbide layers are used $TiCl_4$, $SiH_4$, $GeH_4$, $SiCl_4$, $GeCl_4$, III compound gases, VI compound gases, or the like in addition of an oxygen or hydrocarbon gas. For the synthesis of nitride layers are used $SiH_4$, $B_2H_6$, the above material gases for semiconductor or non-nitride layers, or the like with the addition of $NH_3$ or a nitrogen-containing gas.

High frequency plasma CVD using the above various gases, is preferably performed under a pressure of 13 to 1330 Pa at a power of 20 to 200 W. ECR plasma CVD is preferably performed under a pressure of $10^{-2}$ to 20 Pa at a power of 20 to 500 W, though the suitable power is dependent on the kind of intended nitride or non-nitride.

With the third method of the invention, the surface of each layer is smooth. The thickness of the non-nitride layers is also controlled, and the particle diameter of the semiconductor becomes uniform.

In the methods of the invention, conventional various substrates are available. Inorganic substrates are preferred for heat resistance. If necessary, the substrates can be transparent, though it depends on the use of the resulting materials. Examples of transparent substrates include glass, quartz, alumina, sapphire, MgO or the like.

Preferred embodiments of the invention will be explained below.

EXAMPLE 1

Figure 2:
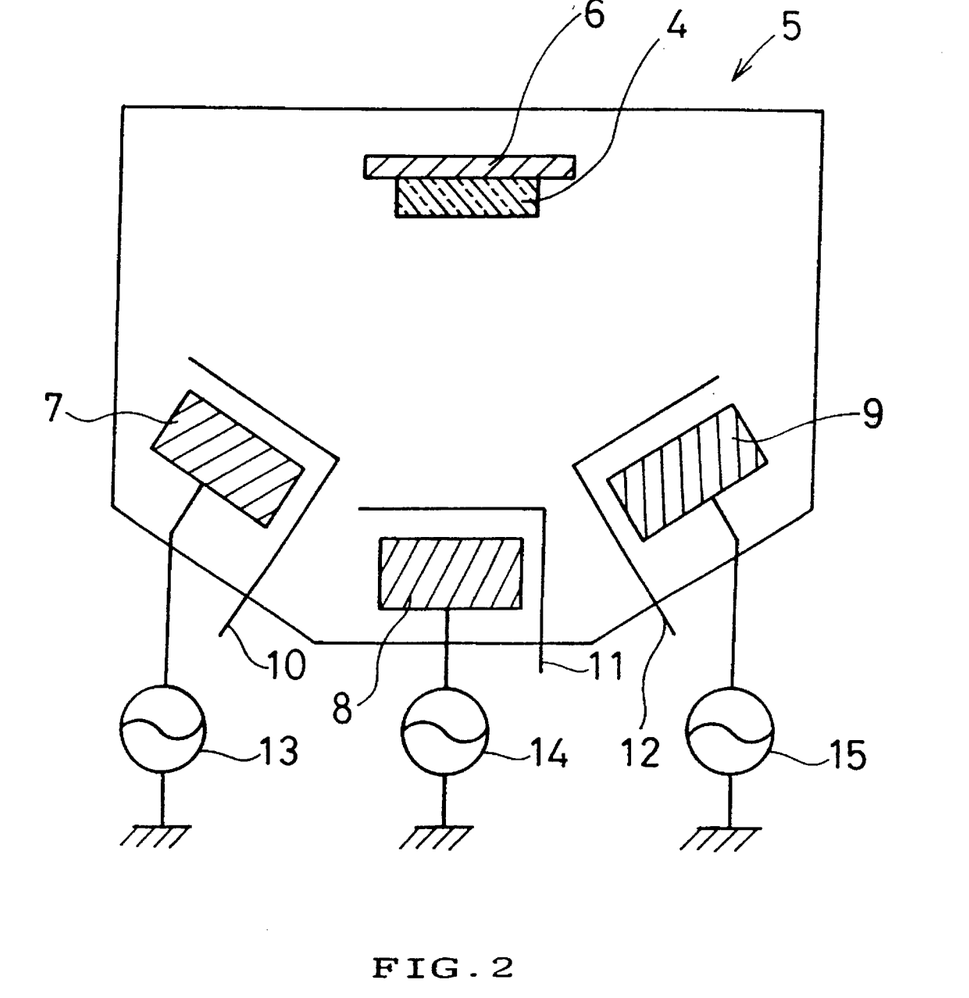
FIG. 2 is a schematic diagram of a sputtering device used in the embodiment of FIG. 1.

FIG. 2 is a schematic diagram of sputtering device 5 provided with semiconductor target 7, non-nitride target 8, nitride target 9, substrate 4, substrate holder 6, power sources 13, 14 and 15, and shutters 10, 11 and 12.

A 10 nm thick AlN layer 3 was first formed on quartz glass substrate 4 by opening only shutter 12 and sputtering AlN target 9, CdSe target 7 and $Al_2O_3$ target 8 in argon gas at 2 Pa while supplying a high frequency power to the targets. After closing shutter 12 and opening shutters 10 and 11, a 10 nm thick $Al_2O_3$ layer 2 containing CdSe fine particle 1 was then formed on AlN layer 3. These processes were repeated and ended by forming AlN layer 3 to finish a nonlinear optical material with a thickness of about 2000 nm in total. The power supplied to targets 7, 8 and 9 was 20, 200, and 250 W, respectively.

The content of Al in $Al_2O_3$ layers 2 or AlN layers 3 measured with a microbeam analyzer, and the content of Cd was similarly measured. The atomic ratio of Cd:Al was approximately 1:3. The content of CdSe fine particle in the whole of the nonlinear optical material was 25 at .%.

The resulting thin film was heat treated at 400° C. A transmission electron microscope was used to observe the particle diameters of the semiconductor fine particles the thickness of the nitride layers and the non-nitride layers.

Figure 3:
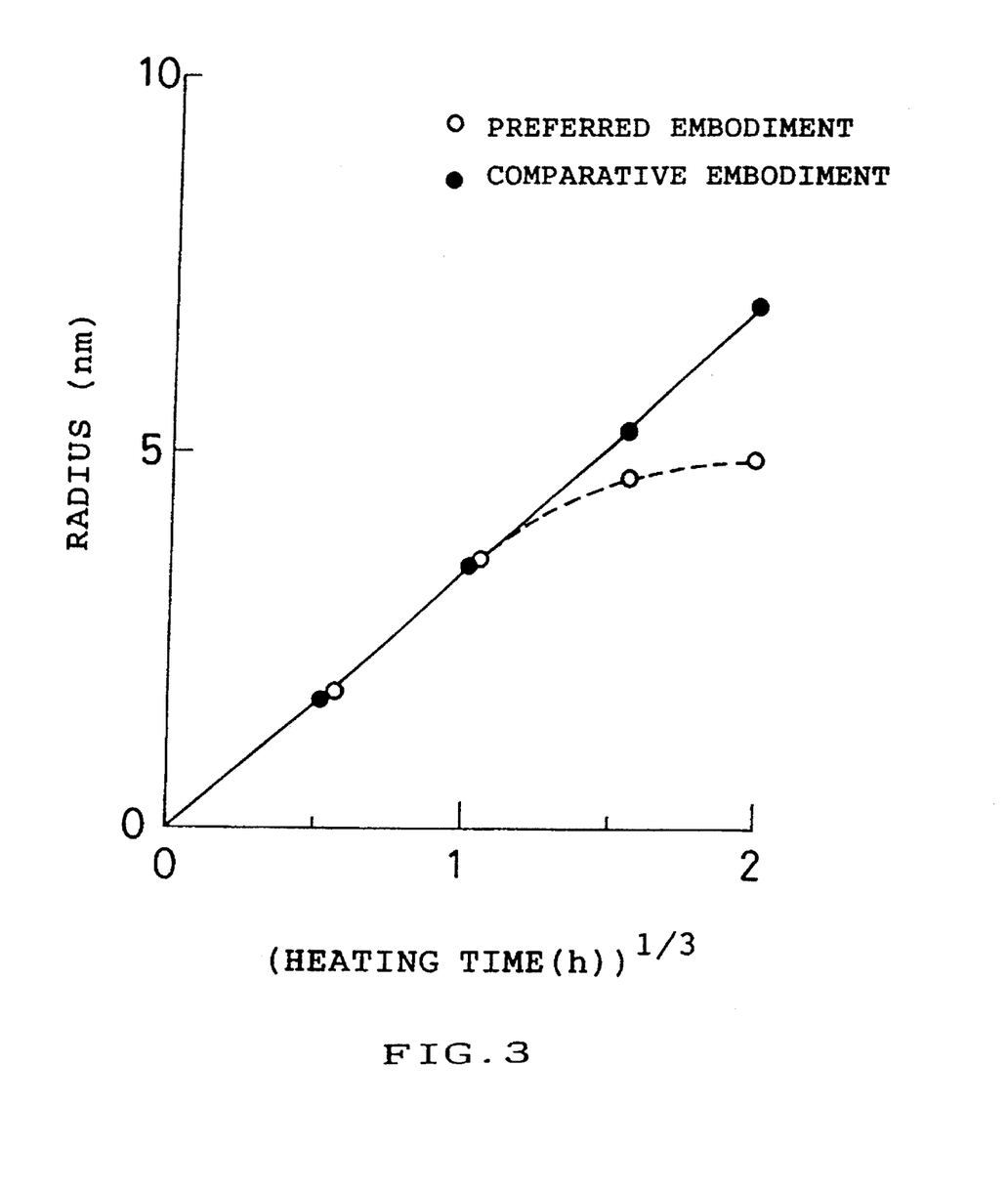
FIG. 3 is a graph showing a relation between reaction time and radii of mean particle diameter in nonlinear optical materials of the embodiment of FIG. 1 and comparative films.

In FIG. 3, the mean particle radii of the thin films are plotted by —o— against the reaction time (unit: hour) raised to the one-third power; the same data for $Al_2O_3$ thin film dispersed with CdSe fine particles are designated by —●—. As is apparent from FIG. 3, the mean particle diameter of the comparative $Al_2O_3$ thin film was proportional to the reaction time raised to the one-third power, and in contrast, that of the film of the invention reached the highest limit of about 5 nm. This arises from the nitride layers sandwiching the non-nitride layers with a thickness of 10 nm.

Figure 4:
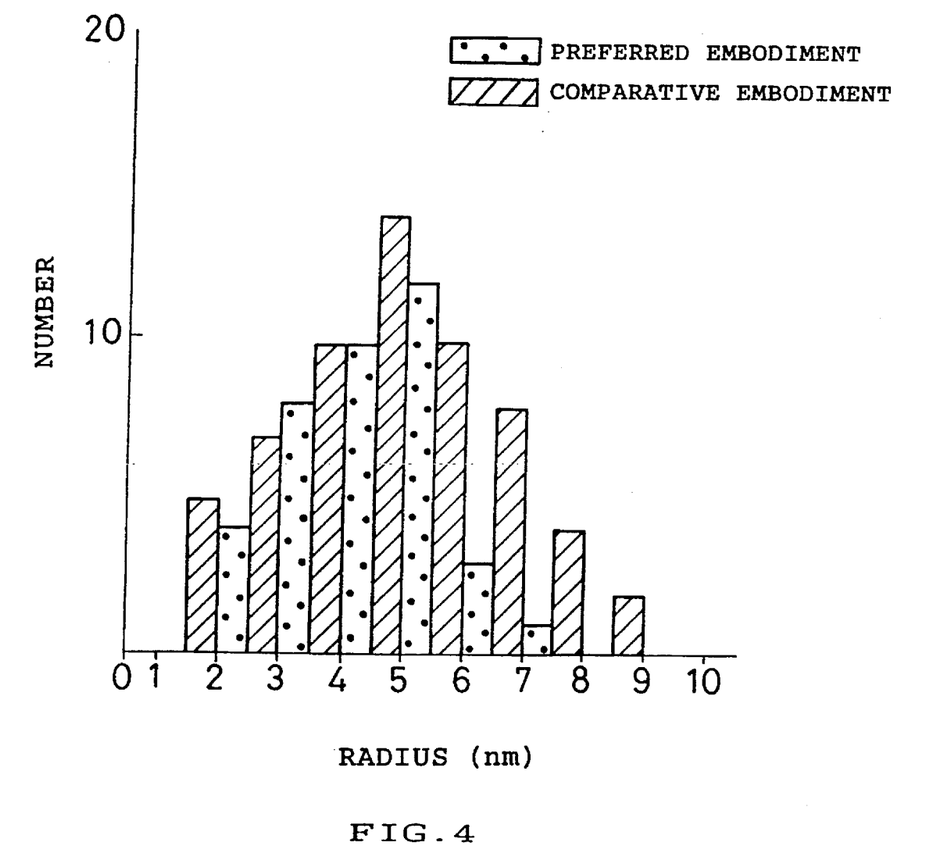
FIG. 4 is a histogram showing particle size distributions of nonlinear optical materials of the embodiment of FIG. 1 and comparative films.

FIG. 4 is a histogram showing the particle size distributions of the same films as above. As seen from the shadowed columns in FIG. 4, the CdSe fine particles in the comparative $Al_2O_3$ film have peaks at a radius of 5 nm, reaching up to 9 nm. On the other hand, the radii of the fine particle. in the intended films designated with the dotted columns peak at 5 nm, and there are fewer samples showing more than 5 nm.

The third order nonlinear optical susceptibilities of the films were measured by the forward degenerate four-wave mixing method using a dye laser excited by nitrogen laser; that of the comparative $Al_2O_3$ film was $1\times10^{-7}$ esu, and that of the invention was $1\times10^{-6}$ esu.

As is apparent from these results, the multiple layer film consisting of the nitride layers and the non-nitride layers with semiconductor fine particles dispersed therein produced by sputtering provides excellent nonlinear optical properties.

Otherwise, an oxide layer can similarly be formed using non-oxide target, oxygen gas and argon gas as sputtering gases instead of using an oxide target. A nitride layer can similarly be formed using a non-nitride target and a nitrogen containing gas instead of using a nitride target.

EXAMPLE 2

Figure 5:
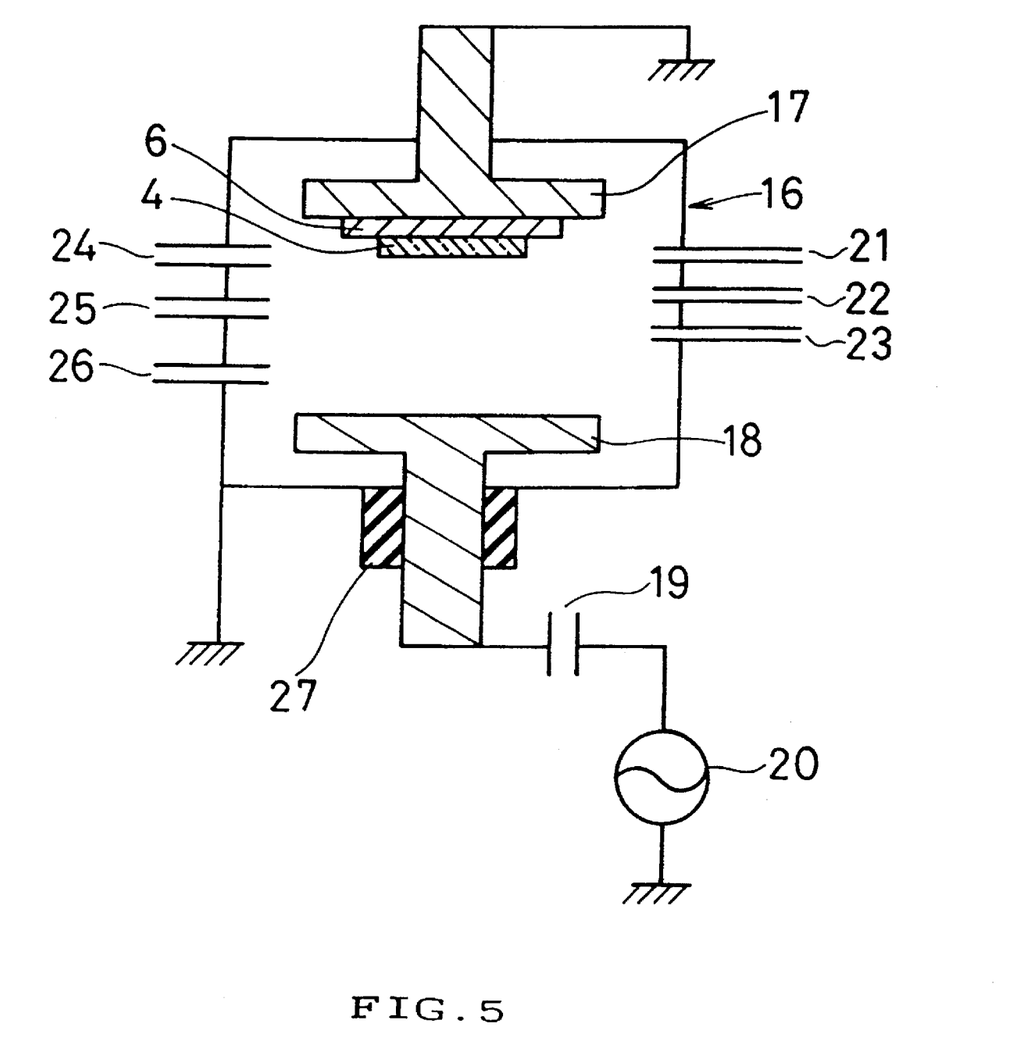
FIG. 5 is a schematic diagram of a high frequency plasma chemical vapor deposition (hereinafter, abbreviated as CVD) device used in an embodiment of the invention.

FIG. 5 shows a plasma CVD device 16 provided with substrate 4, substrate holder 6, anode 17, cathode 18, capacitor 19, high frequency power source 20, feed pipes 21, 22, 23, 24, 25 and 26, and insulators 27.

Material gases of $SiH_4$ and $NH_3$ for forming nitride layer were introduced to device 16 at rates of 1 sccm (standard cubic centimeters per minute) and 8 sccm, respectively, through feed pipes 25 and 26. The total pressure of the gases was 399 Pa. A plasma was generated by applying a high frequency power of 200 W. The plasma decomposed the material gases to form a 10 nm thick SiN layer 3 on MgO subs rate 4. This step of forming a nitride layer is referred to as step (a).

After closing feed pipes 25 and 26, oxygen and trimethyl aluminum ($Al(CH_3)_3$) gas for forming non-nitride layer 2 were introduced at rates of 2 sccm and 1 sccm, respectively, through feed pipes 21 and 22. The total pressure of the gases was 133 Pa. A plasma was generated by applying a high frequency power of 20 W between anode 17 and cathode 18 through capacitor 19. The plasma decomposed the material gases to form an 8 nm thick $Al_2O_3$ layer 2 on SiN layer 3. This step of forming a non-nitride layer is referred to as step (b).

After closing feed pipes 21 and 22, material gases of $Zn(CH_3)_2$ and $H_2Se$ for precipitating a semiconductor fine particle were introduced at rates of 1 sccm and 5 sccm, respectively, through feed pipes 23 and 24. The total pressure of the gases was 266 Pa. A plasma was generated by applying a high frequently power of 10 W. The plasma decomposed the material gases to form ZnSe fine particle 1 in $Al_2O_3$ layer 2. This step of forming a semiconductor fine particle is referred to as step (c).

These steps (a), (b) and (c) were repeated 50 times and were ended by forming a nitride layer until the whole thickness of the material reached about 900 nm.

The content of Zn in the dispersed fine particles, and Al in $Al_2O_3$ layers 2 or AlN layers 3 was measured with a microbeam analyzer. The atomic ratio of Zn:Al:Si was approximately 1:1:3. The content of ZnSe fine particles in the whole of the nonlinear optical material was 20 at .%.

The resulting thin film was heat treated at 500° C. A transmission electron microscope was used to observe the particle diameters of the semiconductor fine particles, the thickness of the nitride layers and the non-nitride layers.

The radius up to 4 nm, of the mean particle diameter of ZnSe fine particles in the $Al_2O_3$ thin film were proportional to the reheating time raised to the one-third power, reaching the highest limit. This arises from the nitride layers sandwiching the non-nitride layers with a thickness of 8 nm.

A histogram showing the mean particle diameters of the films shows that the ZnSe fine particles in the $Al_2O_3$ film have a peak at a radius of 4 nm, and there are fewer samples showing more than 4 nm.

The third order nonlinear optical susceptibilities of the films were measured by the forward degenerate four-wave mixing method using a dye laser excited by nitrogen laser; that of the $Al_2O_3$ film was $8 \times 10^{-7}$ esu.

As is apparent from these results, the multiple layer thin film of the nitride layers and the non-nitride layers with semiconductor fine particles dispersed therein produced by a high frequency plasma CVD provides excellent nonlinear optical properties.

EXAMPLE 3

Figure 6:
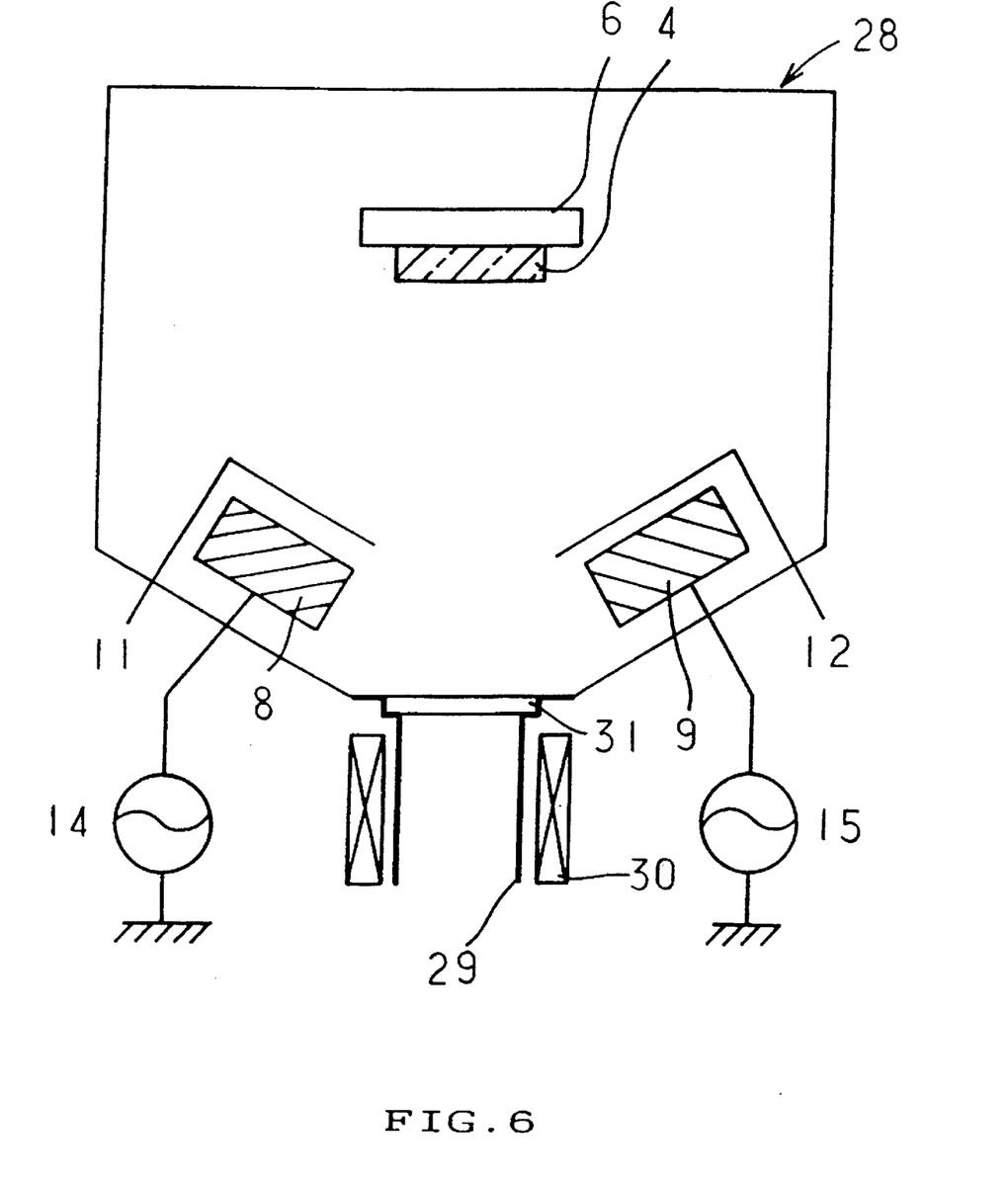
FIG. 6 is a schematic diagram of a device for producing nonlinear optical materials used in an embodiment of the invention.

FIG. 6 is a schematic diagram of device 28 having a sputtering section and a plasma generating section. The sputtering section has non-nitride target 8, nitride target 9, substrate 4, substrate holder 6, power sources 14 and 15, and shutters 11 and 12. The plasma generating section has microwave guide 29, electromagnet 30 and microwave window 31.

While introducing argon gas at a pressure of 0.3 Pa, ECR plasma was generated by applying microwaves of 2.45 GHz at a power of 200 W; a magnetic field with a magnetic intensity of 0.0875 T was applied with electromagnet 30. With shutter 12 the plasma to form a 10 nm thick AlN layer 3 on sapphire ($Al_2O_3$) open, a microwave power of 250 W was supplied to AlN target 9 substrate 4. After closing shutter 12 and opening shutter 11, microwave power of 20 W was supplied to $Al_2O_3$ target 8 to form 3 nm thick $Al_2O_3$ layer 2 on AlN layer 3. These steps were repeated 20 times and were ended by forming a nitride layer 2 until the total thickness of the material reached about 300 nm.

Then, silicon was implanted in the material by ion implantation at an accelerated voltage of 200 keV. The material was heat treated at 700° C. to finish the non-linear optical material.

A transmission electron microscope was used to observe the particle diameters of the semiconductor fine particles in material, the thickness of the nitride layers and the non-nitride layers.

Figure 7:
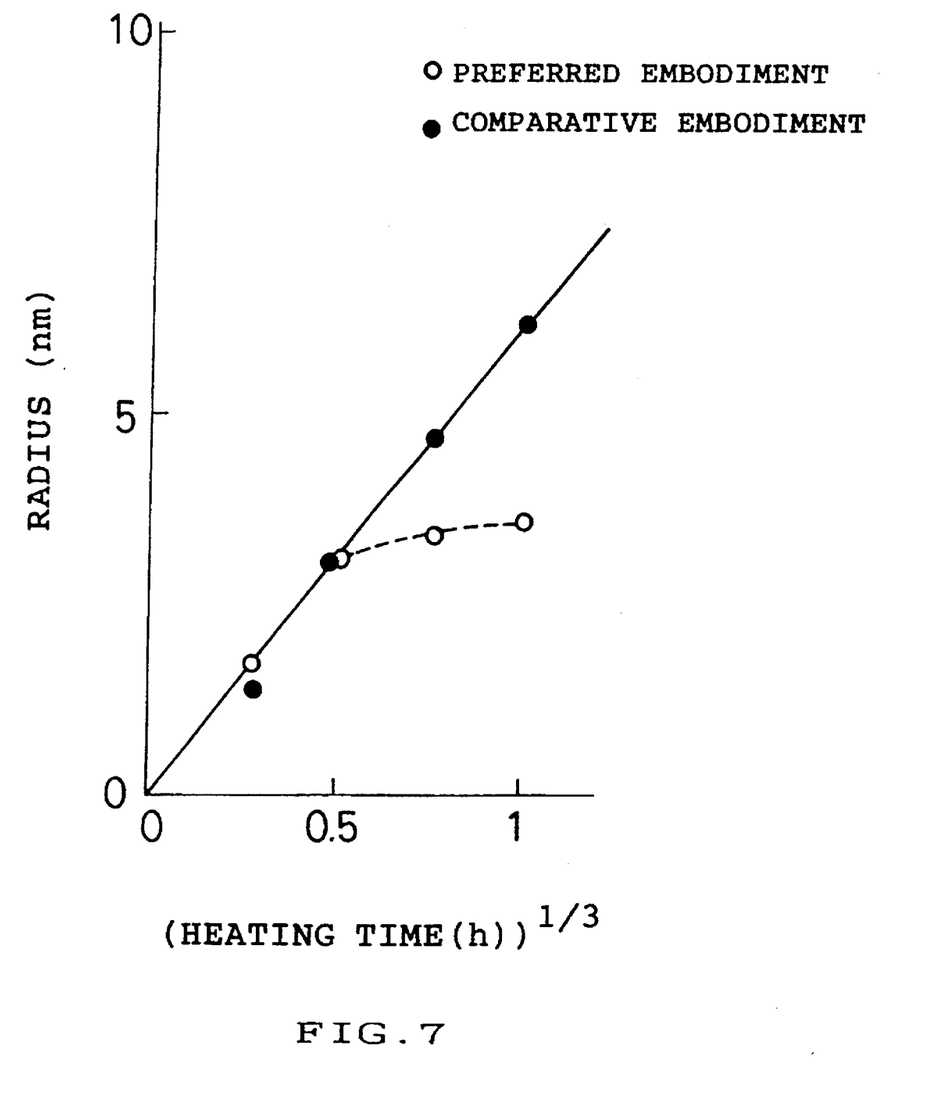
FIG. 7 is a graph showing the relation between reaction time and mean particle radii in nonlinear optical materials of the embodiment of FIG. 1 and comparative films.

In FIG. 7, the radius of the mean particle diameter of the thin films is plotted by —o— against the reheating time (unit: hour) raised to the one-third power, in comparison with the same data for an $Al_2O_3$ thin film with Si fine particles dispersed therein (designated by —●—). As is apparent from FIG. 7, the mean particle diameter of the comparative thin film was proportional to the reheating time raised to the one-third power. By contrast, the particle diameter in the film of the invention saturated at about 3.5 nm. This arises from the nitride layers sandwiching the non-nitride layers with a thickness of 3 nm.

Figure 8:
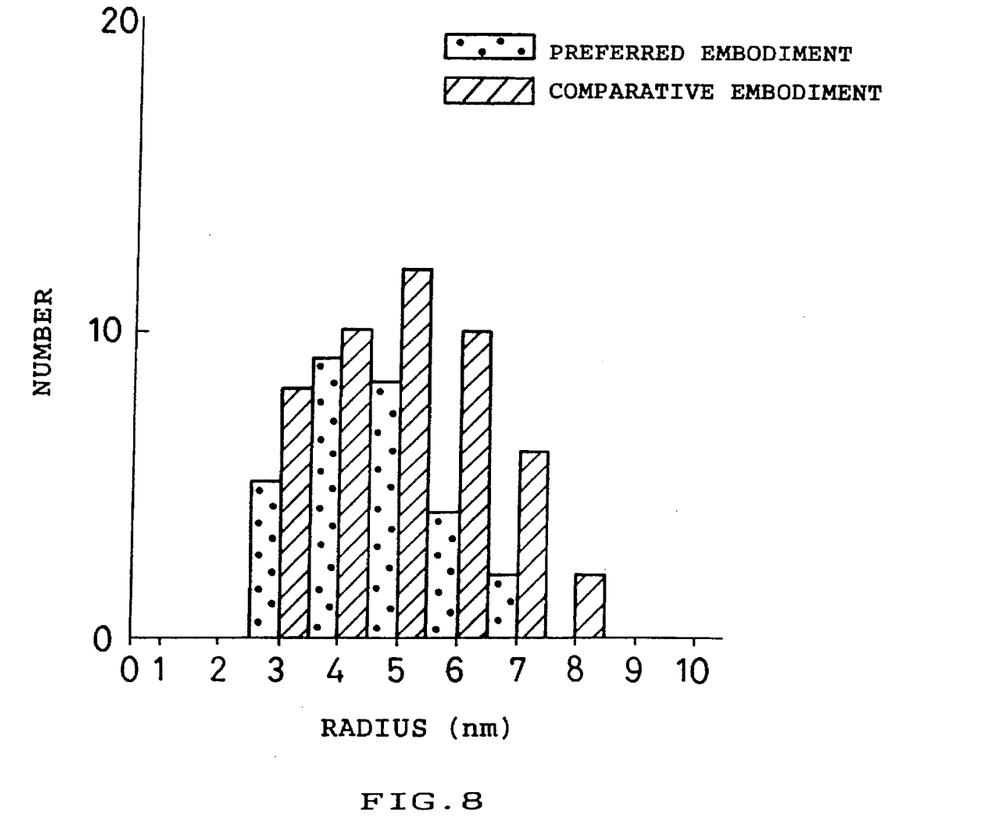
FIG. 8 is a histogram showing particle size distributions of the nonlinear optical materials of this invention and comparative films.

FIG. 8 is a histogram showing the particle size distribution of the same films as above. As seen from the shadowed columns in FIG. 8, the Si fine particles in the comparative film have a peak at a radius of 5 nm, reaching up to 8 nm. On the other hand, the radius of the fine particles of the films of the invention designated with the dotted columns have peaks at 3.5 nm, and there are fewer samples showing more than 5 nm.

The third order nonlinear optical susceptibilities of the films were measured by the forward degenerate four-wave mixing method using a dye laser excited by nitrogen laser; that of the comparative film was $1 \times 10^{-7}$ esu, and that of the invention was $5 \times 10^{-7}$ esu.

As is apparent from these results, a multiple layer thin film of the nitride layers and the non-nitride layers with semiconductor fine particles dispersed therein produced by the method provides excellent nonlinear optical properties.

Otherwise, a nitride layer can similarly be formed using argon gas and a nitrogen containing gas, such as ammonia gas, as the sputtering gases and a non-nitride target, instead of using a nitride target.

The invention may be embodied in other specific forms without departing from the spirit or essential characteristics thereof. The disclosed embodiments are to be considered in all respects as illustrative and not restrictive, the scope of the invention being indicated by the appended claims rather than by the foregoing description and all changes which come within the meaning and range of equivalency of the claims are intended to be embraced therein.

What is claimed is:

1. A nonlinear optical material comprising nitride layers and non-nitride layers which are alternately deposited on a substrate such that the non-nitride layers are located between two nitride layers, wherein (i) said nitride layers are at least substantially free of semiconductor particles and comprise at least one nitride material, and (ii) said non-nitride layers comprise at least one non-nitride material selected from the group consisting of oxides, carbides and semiconductors, and particles dispersed in said at least one non-nitride material, said particles having a substantially uniform particle diameter and comprising at least one semiconductor having an energy band gap smaller than an energy band gap of said nitride material and said non-nitride material.

2. The nonlinear optical material according to claim 1, wherein the at least one nitride material is selected from the group consisting of aluminum nitride, silicon nitride, boron nitride, indium nitride, gallium nitride and titanium nitrite.

3. The nonlinear optical material according to claim 1, wherein the at least one non-nitride material is selected from the group consisting of silicon oxide, aluminum oxide, titanium oxide, zinc oxide, indium oxide, silicon carbide, boron carbide, titanium carbide, silicon, aluminum arsenate, gallium arsenate, indium arsenate and borosilicate glass.

4. The nonlinear optical material according to claim 1, wherein said semiconductor particles comprise at least one semiconductor selected from the group consisting of CuCl, GaAs, InP, GaAlAs, ZnSe, ZnS, ZnTe, CdSe, CdS, CdTe, ZnCdSe, ZnSSe, Si, Ge and SiGe.

5. The nonlinear optical material according to claim 1, wherein the content of said semiconductor particle in the non-nitride layer is 0.01 to 50 at .% of the non-nitride layer.

6. The nonlinear optical material according to claim 1, wherein the thickness of said material is 10 to 2000 nm.

7. The nonlinear optical material according to claim 1, wherein the thickness of each of said nitride layers is 0.25 to 50 nm.

8. The nonlinear optical material according to claim 1, wherein the thickness of each of said non-nitride layers is 0.5 to 10 nm.

* * * * *